US011246086B2

(12) United States Patent
Han et al.

(10) Patent No.: US 11,246,086 B2
(45) Date of Patent: Feb. 8, 2022

(54) METHOD FOR INITIATING AND TERMINATING A SCAN OF A WIRELESS DEVICE, AND WIRELESS DEVICE

(71) Applicant: Alibaba Group Holding Limited, Grand Cayman (KY)

(72) Inventors: Zhe Han, Zhejiang (CN); Lei Wang, Zhejiang (CN); Jun Wu, Zhejiang (CN); Lei Yang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 1 day.

(21) Appl. No.: 16/942,269

(22) Filed: Jul. 29, 2020

(65) Prior Publication Data

US 2020/0359307 A1 Nov. 12, 2020

Related U.S. Application Data

(63) Continuation of application No. PCT/CN2019/077771, filed on Mar. 12, 2019.

(30) Foreign Application Priority Data

May 29, 2018 (CN) ........................ 201810527138.5

(51) Int. Cl.
*H04W 4/80* (2018.01)
*H04W 76/38* (2018.01)
(Continued)

(52) U.S. Cl.
CPC ........... *H04W 48/16* (2013.01); *H04W 76/32* (2018.02); *H04W 76/38* (2018.02); *H04W 76/40* (2018.02)

(58) Field of Classification Search
CPC ..... H04W 48/16; H04W 76/38; H04W 76/40; H04W 76/32; H04W 8/005; H04W 4/80; H04W 6/10; G06F 9/44526
See application file for complete search history.

(56) References Cited

U.S. PATENT DOCUMENTS

2006/0156380 A1* 7/2006 Gladstone ............. H04L 63/145 726/1
2008/0296472 A1* 12/2008 Chen ..................... H01J 37/304 250/205
(Continued)

FOREIGN PATENT DOCUMENTS

CN 102339118 2/2012
CN 104980194 10/2015
(Continued)

OTHER PUBLICATIONS

International Searching Authority, International Search Report, issued in connection with International Application No. PCT/CN2019/077771, dated May 30, 2019, 2 pages.
(Continued)

*Primary Examiner* — Andrew Wendell
(74) *Attorney, Agent, or Firm* — Hanley, Flight & Zimmerman, LLC

(57) ABSTRACT

The embodiments of the present disclosure disclose a method for initiating and terminating a scan of a wireless device, and a wireless device. A sequence of time-of-initiation including a specified number of historical initiation time points is provided. The method comprises: receiving a scan OFF instruction from a requester; calculating a time difference between a current time point and an earliest historical initiation time point in the sequence of time-of-initiation, and comparing the time difference with the specified period to determine whether to terminate a current scan, in response to the scan OFF instruction; and continuing with the current scan until a target time point, and terminating the current scan at the target time point, if it is determined not to terminate the current scan. The technical solutions provided in the embodiments can improve speed of response of the wireless device to the scan ON and OFF instructions.

20 Claims, 4 Drawing Sheets

Receiving a scan OFF instruction from a requester — S11

Calculating a time difference between a current time point and an earliest historical initiation time point in the sequence of time-of-initiation, and comparing the time difference with the specified period to determine whether to terminate a current scan, in response to the scan OFF instruction — S13

Continuing with the current scan until a target time point, and terminating the current scan at the target time point, if it is determined not to terminate the current scan, wherein the time difference between the target time point and the earliest historical initiation time point in the sequence of time-of-initiation is greater than or equal to the specified period — S15

(51) Int. Cl.

| | |
|---|---|
| ***H04W 48/16*** | (2009.01) |
| ***H04W 76/40*** | (2018.01) |
| ***H04W 76/32*** | (2018.01) |

(56) References Cited

U.S. PATENT DOCUMENTS

2014/0341069 A1* 11/2014 Alon .................... H04W 24/00 370/254
2016/0081009 A1 3/2016 Tailor et al.
2016/0127874 A1* 5/2016 Kingsmill ......... H04M 1/72415 455/456.1
2016/0227544 A1* 8/2016 Katar .................... H04W 76/10
2016/0286477 A1* 9/2016 Lin ......................... H04L 5/006
2017/0094556 A1* 3/2017 HomChaudhuri .... H04W 48/16
2019/0020741 A1* 1/2019 Knaappila ............... H04W 4/80
2019/0306732 A1* 10/2019 Dhanapal ............. H04W 24/08

FOREIGN PATENT DOCUMENTS

CN 105873192 8/2016
CN 106851784 6/2017
CN 106940926 7/2017
CN 108990029 12/2018
WO 2016059078 4/2016

OTHER PUBLICATIONS

The State Intellectual Property Office of People's Republic of China, First Office Action, issued in connection with Chinese Application No. 201810527138.5, with English translation, dated Feb. 25, 2020, 9 pages.

The State Intellectual Property Office of People's Republic of China, Search Report, issued in connection with Chinese Application No. 201810527138.5, with English translation, dated Feb. 25, 2020, 5 pages.

* cited by examiner

METHOD FOR INITIATING AND TERMINATING A SCAN OF A WIRELESS DEVICE, AND WIRELESS DEVICE

CROSS-REFERENCE TO RELATED APPLICATIONS

This application is a continuation of International Application No. PCT/CN2019/077771, filed on Mar. 12, 2019, which claims priority to Chinese Patent Application No. 201810527138.5, filed on May 29, 2018, both of which are hereby incorporated by reference in their entireties.

TECHNICAL FIELD

The embodiments of the present disclosure relate to the technical field of wireless communication, and particularly relate to a method for initiating and terminating a scan of a wireless device, and a wireless device.

BACKGROUND

With the ongoing evolvement of the terminal devices, more and more terminal devices are equipped with wireless functionalities which can be implemented by wireless communication components, such as a WiFi component, a Bluetooth component, a ZigBee component, an NFC component, etc. Among them, some wireless communication components may, before a wireless signal transmission, send out scan signals and establish connections with other wireless communication components by means of the scan signals. Taking the Bluetooth component as an example, in a Bluetooth communication, the Bluetooth component can operate in a peripheral mode or a central mode. A Bluetooth component in the central mode can actively scan surrounding Bluetooth components in the peripheral mode, while a Bluetooth component in the peripheral mode can send out broadcast information and wait to be connected by a Bluetooth component in the central mode.

Traditionally, there would generally be a limitation to the number of times to initiate a scan by the wireless communication component in a specified period, in a consideration that the process of actively initiating a scan is power-consuming. For example, for the Bluetooth component, it is generally allowed to initiate the scan for 5 times at most in 30 seconds. If the times of scans initiated in the specified period exceeds the limit, the wireless communication component will refuse to respond to a scan ON instruction from the requester. As a result, the wireless communication component has to wait a period of time before initiating the scan process normally. Therefore, the traditional method for initiating and terminating a scan is limited by the number of times to initiate a scan in a specified period, which may result in a delayed response of the wireless communication component.

SUMMARY

An objective of the embodiments of the present disclosure is to provide a method for initiating and terminating a scan of a wireless device, which can improve speed of response of the wireless device to a scan ON instruction and a scan OFF instruction.

In order to achieve the above objective, an embodiment of the present disclosure provide a method for initiating and terminating a scan of a wireless device. The wireless device is provided with an upper limit for the number of times to initiate the scan in a specified period, and a sequence of time-of-initiation including a specified number of historical initiation time points is provided, with the specified number being determined based on the upper limit. The method comprises: receiving a scan OFF instruction from a requester; calculating a time difference between a current time point and an earliest historical initiation time point in the sequence of time-of-initiation, and comparing the time difference with the specified period to determine whether to terminate a current scan, in response to the scan OFF instruction; and continuing with the current scan until a target time point and terminating the current scan at the target time point, if it is determined not to terminate the current scan, wherein the time difference between the target time point and the earliest historical initiation time point in the sequence of time-of-initiation is greater than or equal to the specified period.

In order to achieve the above objective, an embodiment of the present disclosure further provide a wireless device. The wireless device is provided with an upper limit for the number of times to initiate a scan in a specified period. The wireless device comprises: a storage unit configured to store a sequence of time-of-initiation, which includes a specified number of historical initiation time points, with the specified number being determined based on the upper limit; an OFF instruction receiving unit configured to receive a scan OFF instruction from a requester; a determining unit configured to calculate a time difference between a current time point and an earliest historical initiation time point in the sequence of time-of-initiation, and compare the time difference with the specified period to determine whether to terminate the current scan, in response to the scan OFF instruction; and a scan continuing unit configured to continue with the current scan until a target time point and terminate the current scan at the target time point, if it is determined not to terminate the current scan. The time difference between the target time point and the earliest historical initiation time point in the sequence of time-of-initiation is greater than or equal to the specified period.

In order to achieve the above objective, an embodiment of the present disclosure further provide a wireless device. The wireless device is provided with an upper limit for the number of times to initiate a scan in a specified period. The wireless device includes a memory and a processor, and the memory is configured to store a computer program and a sequence of time-of-initiation. The sequence of time-of-initiation comprises a specified number of historical initiation time points, and the specified number is determined based on the upper limit. The computer program is configured to implement, when being executed by the processor, the above-mentioned method.

In order to achieve the above objective, an embodiment of the present disclosure further provide a method for initiating and terminating a scan of a wireless device. The wireless device is provided with an upper limit for the number of times to initiate a scan in a specified period, and a threshold duration determined based on the specified period and the upper limit is provided. The method comprises: upon receipt of a scan OFF instruction for a current scan from a requester, comparing a duration of the current scan with the threshold duration, and determining whether to terminate the current scan based on a result of the comparing; and continuing with the current scan, and terminating the current scan when the duration of the current scan reaches said threshold duration, if it is determined not to terminate the current scan.

In order to achieve the above objective, an embodiment of the present disclosure further provide a wireless device. The wireless device is provided with an upper limit for the number of times to initiate a scan in a specified period, and comprises a storage unit configured to store a threshold duration determined based on the specified period and the upper limit; a determining unit configured to compare a duration of a current scan with the threshold duration, and determining whether to terminate the current scan based on a result of the comparing, upon receipt of a scan OFF instruction for the current scan from a requester; and a scan continuing unit configured to continue with the current scan and terminate the current scan when a duration of the current scan reaches said threshold duration, if it is determined not to terminate the current scan.

In order to achieve the above objective, an embodiment of the present disclosure further provide a wireless device. The wireless device is provided with an upper limit for the number of times to initiate a scan in a specified period, and comprises a memory and a processor. The memory is configured to store a computer program and a threshold duration determined based on the specified period and the upper limit, and the computer program is configured to implement, when being executed by the processor, the above method.

According to the embodiments of the present disclosure, a sequence of time-of-initiation, which may include historical initiation time points in a recent period of time, may be loaded in advance. The historical initiation time points may represent time points at which a wireless scan service is initiated. In practical applications, a wireless device may have an upper limit for the number of times to initiate a scan in a specified period, and the number of the historical initiation time points included in the sequence of time-of-initiation may be identical to the upper limit. For example, the wireless device may be allowed to initiate the scan service for 5 times at most in 30 seconds, and accordingly the sequence of time-of-initiation may include the latest 5 historical initiation time points. In this way, if a scan OFF instruction is received from the requester in the process of a scan service, the wireless device will not simply terminate the current scan, but rather calculate a time difference between a current time point and an earliest historical initiation time point in the sequence of time-of-initiation. If the time difference exceeds the specified period, it means that the number of scans initiated in the specified period does not exceed the upper limit, and a further scan service can be initiated if afterwards a scan ON instruction is received again from the requester. In such a case, the current scan can be simply terminated. However, if the calculated time difference is less than the specified period, it means that the number of scans initiated in the specified period has reached the upper limit. In this case, if the current scan is terminated, a scan ON instruction received from the requester shortly after cannot be responded to, because it is not allowed to initiate a further scan in the specified period. Thus, in the embodiments of the present disclosure, if the calculated time difference is less than the specified period, the current scan will not be terminated, but rather the process of the current scan will continue. However, feedback of the scan result to the requester may be stopped, therefore from the perspective of the requester, the current scan has been terminated, although in fact the scan is still in progress. When the current scan proceeds to a target time point, the process of the current scan can be normally terminated. The time difference between the target time point and the earliest historical initiation time point in the sequence of time-of-initiation is greater than or equal to the specified period, which ensures that a next scan can be normally initiated after the current scan is terminated. Further, if a scan ON instruction is received from the requester in the process of the current scan, the current scan result can be immediately provided to the requester, since in fact the current scan has not been terminated. In this way, from the perspective of the requester, reception of the scan result is stopped in response to the scan OFF instruction, and is timely resumed in response to the scan ON instruction. Thus, in the embodiments of the present disclosure, it is possible to respond timely to the scan ON instruction and the scan OFF instruction issued from by the requester, the speed of response of the wireless device to the scan ON instruction and the scan OFF instruction is improved.

BRIEF DESCRIPTION OF DRAWINGS

In order to describe the technical solutions of the embodiments in the present disclosure or the prior art more clearly, the accompanying drawings for the embodiments or the prior art will be briefly introduced in the following. It is apparent that the accompanying drawings described in the following involve merely some embodiments disclosed in this disclosure, and those skilled in the art can derive other drawings from these accompanying drawings without creative efforts.

DETAILED DESCRIPTION

Figure 1:
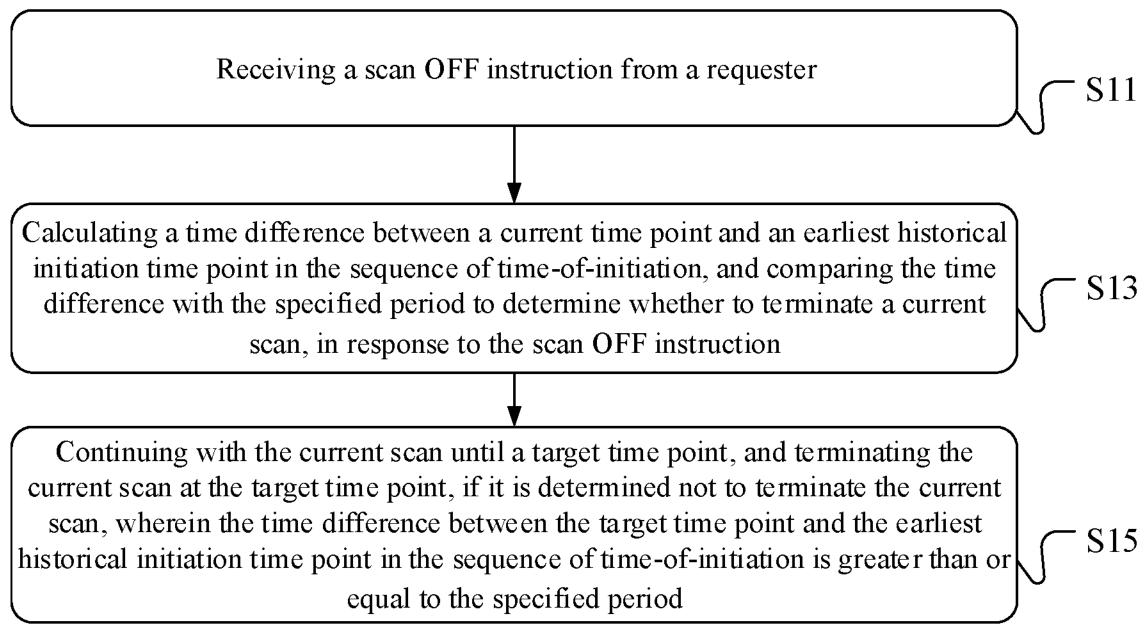
FIG. 1 is a flowchart of a method for initiating and terminating a scan of a wireless device provided by an embodiment of the present disclosure.

In order to enable those skilled in the art to better understand the technical solutions in the present disclosure, the technical solutions of the embodiments in the present disclosure will be clearly and comprehensively described in the following with reference to the accompanying drawings. It is apparent that the embodiments as described are merely some, rather than all, of the embodiments of the present disclosure. All other embodiments obtained by those skilled in the art based on one or more embodiments described in the present disclosure without creative efforts should fall within the scope of this disclosure.

An embodiment of the present disclosure provides a method for initiating and terminating a scan of a wireless device which may be a terminal device equipped with wireless communication components. For example, the wireless device may be a smart phone, a tablet computer, a smart wearable device (a smart watch, virtual reality glasses, etc.), a vehicle-onboard device, a special-purpose device, etc. equipped with WiFi components and Bluetooth components. In the wireless device, process of initiating or terminating a scan may be performed by a service application component, which may run in a backend of a system and generally do not provide a user interface. In addition, in the wireless device, a data interaction may be performed with the service application component through an activity application component which may provide an interaction interface to a user and receive an instruction from the user to initiate or terminate the wireless scan (e.g., to turn on Bluetooth function or to turn off a Bluetooth function). The activity application component may forward the instruction issued by the user to the service application component, receive a scan result fed back from the service application component, and display the scan result to the user in the interaction interface. Specifically, for a terminal device installed with an Android system, the service application component may be for example a service component, and the activity application component may be for example an activity component. Of course, in practical applications, names of the respective components in different operation programs may be different, and one or more components may be customized in the operation program to implement the functions of the above service application component and activity application component, which are not limited in the embodiments of the present disclosure.

The wireless device in the embodiments of the present disclosure generally has an upper limit for the number of times to initiate a scan in a specified period. For example, if it is allowed to initiate a scan service for 5 times at most in a period of 30 seconds, 30 seconds may be set as the specified period, and 5 may be set as the upper limit. In this embodiment, a sequence of time-of-initiation may be set up in advance, for storing the historical initiation time points in a recent period of time. The historical initiation time point may represent a time point at which the wireless scan service is initiated. The specified number of the historical initiation time points stored in the sequence of time-of-initiation may be determined based on the upper limit associated with the wireless device. Specifically, the specified number may be identical to the upper limit. For example, if the wireless device is allowed to initiate the scan service for 5 times at most in the specified period, the number of the historical initiation time points stored in the sequence of time-of-initiation may also be 5. If the sequence of time-of-initiation is full of historical time points and a new historical time point is yet to be written thereinto, a first-in-first-out principle may be adopted, i.e., the oldest historical time point stored in the sequence may be deleted, and then the new historical time point may be written into the sequence.

Referring to FIG. 1, a method for initiating and terminating a scan of a wireless device provided in an embodiment of the present disclosure may comprise the following steps.

S11: receiving a scan OFF instruction from a requester.

In this embodiment, the requester may be an entity that issues a scan OFF instruction or a scan ON instruction. In practical applications, the requestor may be the above-mentioned activity application component, which may interact with a user to receive a scan OFF instruction from the user. The activity application component may forward the scan OFF instruction received from the user to the service application component. In this way, the service application component, which may be the entity for performing step S11, may receive the scan OFF instruction from the requester.

Figure 2:
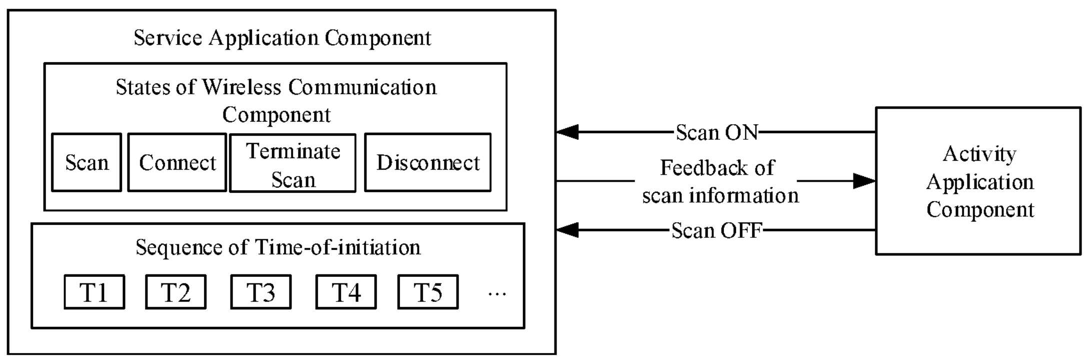
FIG. 2 is a schematic diagram of an interaction between application components provided by an embodiment of the present disclosure.

Referring to FIG. 2, in practical applications, the functionalities of connecting, scanning, disconnecting, terminating a scan, etc. of the wireless communication component may be implemented by the service application component. In addition, the above-mentioned sequence of time-of-initiation may be stored in the service application component. T1 to T5 in the sequence of time-of-initiation may represent the historical initiation time points. The activity application component may issue a scan ON instruction or a scan OFF instruction to the service application component, and may receive scan information fed back by the service application component. The scan information may include information on currently scanned other wireless devices. For example, the scan information may include device identifier of other wireless devices, Received Signal Strength Indicators (RSSIs) associated with other wireless devices, etc.

S13: calculating a time difference between a current time point and an earliest historical initiation time point in the sequence of time-of-initiation, and comparing the time difference with the specified period to determine whether to terminate a current scan, in response to the scan OFF instruction.

S15: continuing with the current scan until a target time point and terminating the current scan at the target time point, if it is determined not to terminate the current scan. The time difference between the target time point and the earliest historical initiation time point in the sequence of time-of-initiation may be greater than or equal to the specified period.

In this embodiment, when the scan OFF instruction is received, the wireless device may currently be in the progress of a scan, and the service application component may not simply terminate the current scan in the backend, but instead stop feedback of the current scan information to the requester in response to the scan OFF instruction. In this way, the requester will no longer receive the feedback scan information after issuing the scan OFF instruction. Thus, from the perspective of the requestor, the service application component responds timely to the scan OFF instruction by terminating the current scan. However, in fact, the service application component merely stops feedback of the scan information to the requester. The service application component may further determine whether the current scan should be terminated at the moment. Specifically, the service application component may calculate a time difference between the current time point and the earliest historical initiation time point in the sequence of time-of-initiation, and compare the time difference to the specified period to determine whether to terminate the current scan based on a result of the comparing.

Figure 3:
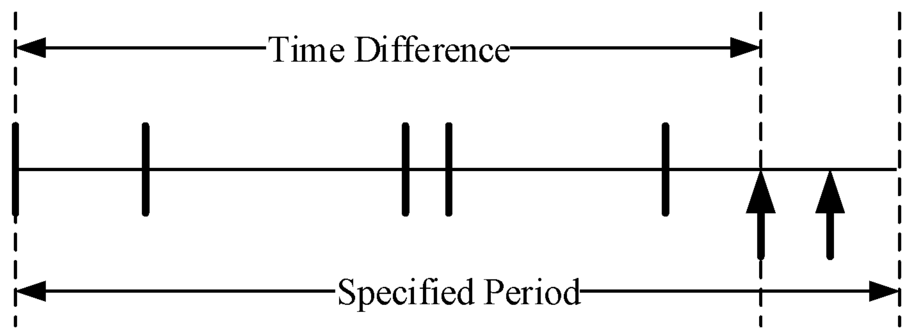
FIG. 3 is a first schematic diagram of a timeline provided by an embodiment of the present disclosure.
Figure 4:
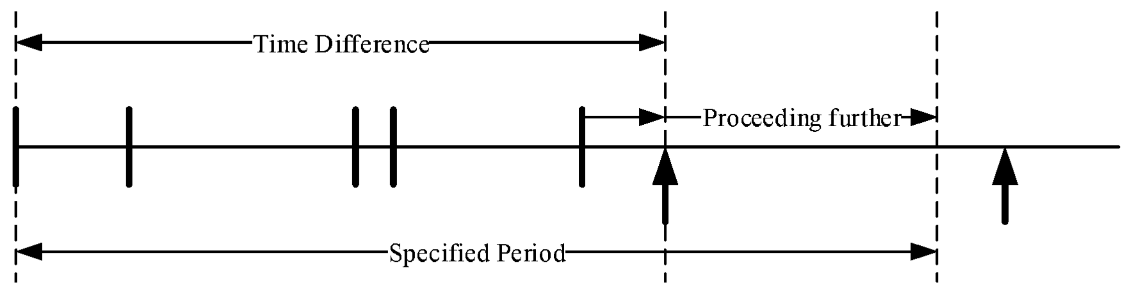
FIG. 4 is a second schematic diagram of a timeline provided by an embodiment of the present disclosure.

In this embodiment, the number of the historical initiation time points included in the sequence of time-of-initiation is identical to the upper limit associated with the wireless device. Therefore in the case that the time difference is less than the specified period, if the scan is terminated at the moment, the service application component will fail in timely initiating a new scan when the requestor issues a scan ON instruction later, as the new scan conflicts with the upper limit. For example, referring to FIG. 3, it is assumed that the upper limit of the number of times to initiate a scan in the specified period is 5, the horizontal line represents a time axis, and the vertical short solid lines represent the historical initiation time points in the sequence of time-of-initiation, the leftmost vertical solid line may be the earliest historical initiation time point. If the service application component receives a scan OFF instruction at a first upward short arrow, the calculated time difference is less than the specified period. If the current scan is terminated immediately as in the related art (the current scan is the scan initiated at the fifth vertical solid line), when a scan ON instruction is received at the second upward short arrow, this scan ON instruction cannot be executed because it is not allowed to initiate a sixth scan in the specified period. Therefore, in this embodiment, if the time difference is less than the specified period, it may be determined not to terminate the current scan. In this case, the service application component at the backend may continue with the current scan until the target time point. The time difference between the target time point and the earliest historical initiation time point in the sequence of time-of-initiation needs to be greater than or equal to the specified period. Thus, the current scan may be terminated at the target time point when the current scan is proceeded to the target time point. In this way, it can be guaranteed that the scan ON request issued later can be timely responded to. For example, reference can be made to FIG. 4. As in FIG. 3, the sequence of time-of-initiation includes 5 historical initiation time points, and a scan OFF instruction is received at the first upward short arrow. Since at that time the time difference is less than the specified period, the current scan may continue. When it approaches to the target time point, the time difference is equal to the specified period, and therefore the current scan may be terminated. When a scan ON instruction is received at the second upward short arrow, the service application component may initiate a new scan normally, as this scan ON instruction is out of the specified period.

Figure 5:
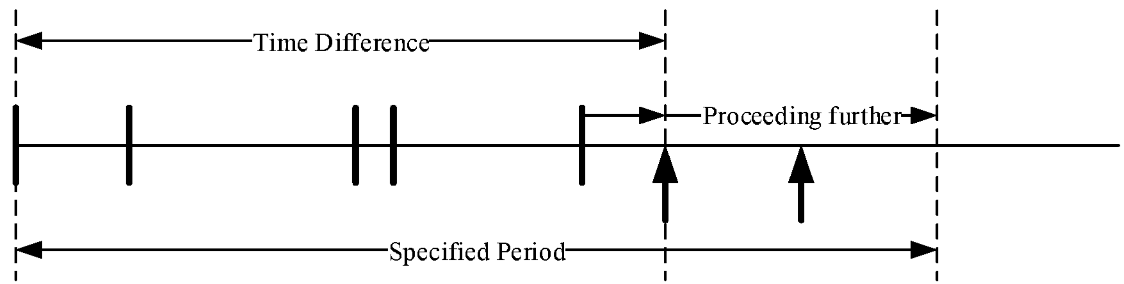
FIG. 5 is a third schematic diagram of a timeline provided by an embodiment of the present disclosure.

In one embodiment, if a scan ON instruction is received from the requester in the process of the current scan, the scan information may be immediately provided to the requester, since the current scan is in fact not terminated (only the feedback of the scan information is stopped), and the current scan may continue but not be terminated after the target time point. Referring to FIG. 5, the second upward short arrow represents the time point at which the scan ON instruction is received, at this point the scan information may be immediately provided, since the current scan is actually in progress. Furthermore, since a scan ON instruction is received, the scan will continue but not be terminated after the target time point, until the next scan OFF instruction is received, and then it is determined whether to terminate the current scan according to the above process. As illustrated in FIG. 5, although a scan ON instruction is received at the second upward short arrow, in fact the service application component does not initiate a new scan service but instead proceed with the current scan. In this way, the upper limit of the number of times to initiate a scan is not violated. In addition, according to the embodiments of the present disclosure, if a scan ON instruction is received in the process of the current scan, it is possible to provide immediately the scan information without need to initiate a scan, therefore the timeliness in providing scan information is improved.

In one embodiment, if the calculated time difference is greater than or equal to the specified period, it may be determined to terminate the current scan. If a scan ON instruction is received from the requester later after the current scan is terminated, the service application component may normally initiate a new scan, because the scan ON instruction is out of the specified period. However, after the new scan is initiated, the service application component needs to update the historical initiation time points in the sequence of time-of-initiation. Specifically, the service application component may delete the earliest historical initiation time point from the sequence of time-of-initiation and write an initiation time point corresponding to the new scan into the sequence, in a manner of first-in-first-out. In addition, the service application component may feed back the scan information produced in the new scan to the requester to indicate that the current scan is normally in progress.

In one embodiment, it is take into consideration that the user may frequently initiate or terminate the scan service in a short period of time, and for each time the user has to wait for the scan service to be initiated. In order to reduce the waiting time of the user, a lag time may be preset in this embodiment, which may allow the service application component to continue with the current scan for a period of time after receipt of the scan OFF instruction. Therefore if the user issues a scan ON instruction again in a short period of time, scan result may be provided immediately without need to initiate a new scan service. Accordingly, after a scan OFF instruction is received from the requester, the time difference between the current time point and the earliest historical initiation time point in the sequence of time-of-initiation may be calculated and compared with a sum of the specified period and the preset lag time. If the time difference is less than the sum of the specified period and the preset lag time, it is determined not to terminate the current scan but to continue with the current scan until the time difference reaches the sum of the specified period and the preset lag time. If a scan ON instruction is received from the requester in the process of the current scan, operations may be performed as described in the above embodiments, and detailed description may be omitted here. If the time difference is greater than or equal to the sum of the specified period and the preset lag time, it means that the user does not issue a scan ON instruction in a short period of time, and it may be determined to terminate the current scan.

Figure 6:
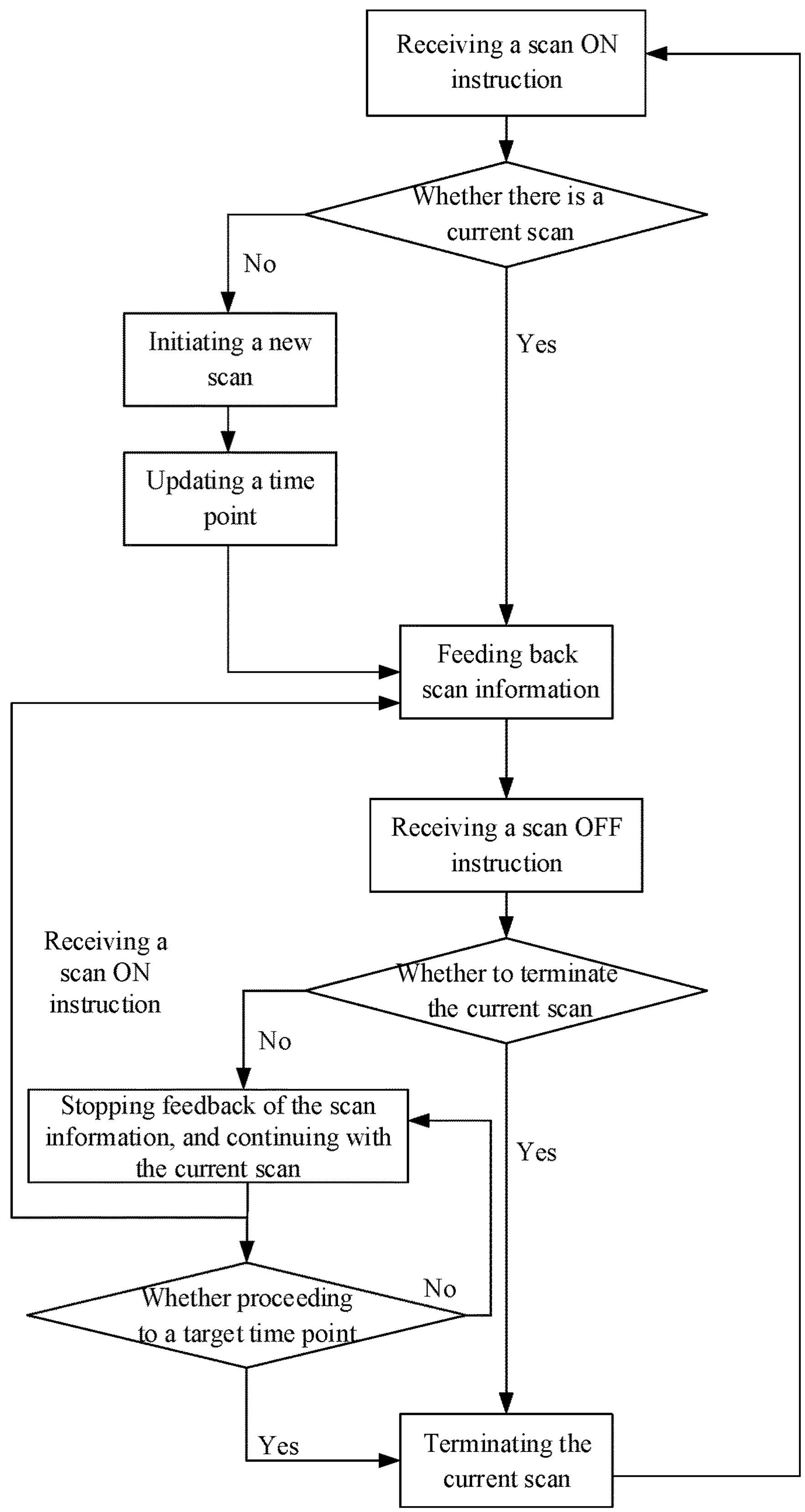
FIG. 6 is a flowchart of a specific application example provided by the present disclosure.

Referring to FIGS. 2 and 6, in a specific application example, the service component may determine whether the scan service has been terminated upon receipt of the scan ON instruction from the activity component. If not, the service component may simply feed back the current scan information to the activity component and keep the current scan service in progress. If no scan service is currently in progress, a new scan service may be initiated, and the current time point may be written into the sequence of time-of-initiation in a first-in-first-out manner. After the new scan service is initiated, scan information may be fed back to the service component.

In this application example, if the activity component issues a scan OFF instruction to the service component, the activity component may stop feedback of the scan information to the service component, and determine whether the current scan should be terminated according to the method described in the above embodiment. If it is determined not to terminate the current scan, the current scan may be proceeded to the target time point, and then the current scan may be terminated. Of course, if a scan ON instruction is received from the service component in the process of the current scan, the current scan information may be fed back to the service component immediately, and the current scan may be kept in progress.

Figure 7:
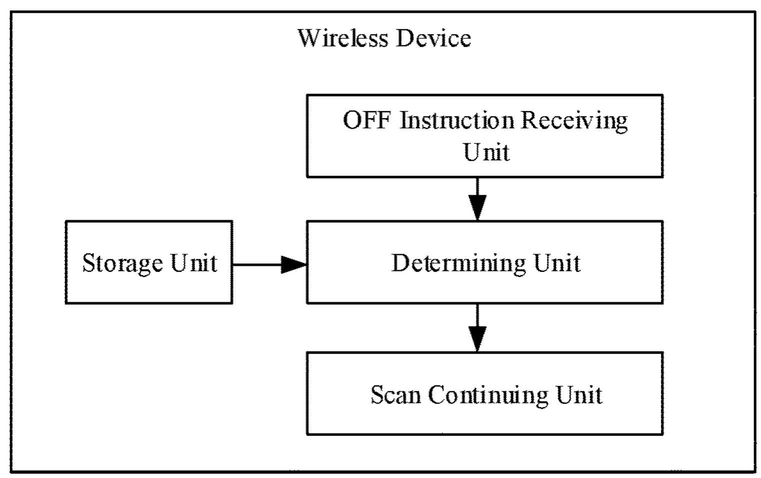
FIG. 7 is a schematic diagram of functional modules of a wireless device provided by an embodiment of the present disclosure.

Referring to FIG. 7, an embodiment of the present disclosure further provides a wireless device which is provided with an upper limit for the number of times to initiate a scan in a specified period, comprising:

a storage unit configured to store a sequence of time-of-initiation, which may include a specified number of historical initiation time points, the specified number being determined based on the upper limit;

an OFF instruction receiving unit configured to receive a scan OFF instruction from a requester;

a determining unit configured to calculate a time difference between a current time point and an earliest historical initiation time point in the sequence of time-of-initiation, and compare the time difference with the specified period to determine whether to terminate a current scan, in response to the scan OFF instruction; and a scan continuing unit configured to continue with the current scan until a target time point and terminate the current scan at the target time point, if it is determined not to terminate the current scan. The time difference between the target time point and the earliest historical initiation time point in the sequence of time-of-initiation is greater than or equal to the specified period.

In one embodiment, the wireless device may further comprise:

a scan information feedbacking unit configured to stop feedback of the current scan information to the requester in response to the scan OFF instruction.

In one embodiment, the wireless device may further comprise:

a scan continuing unit configured to feed back the current scan information to the requester, and continue with the current scan even after the target time point, if a scan ON instruction is received from the requester in the process of the current scan.

In one embodiment, the wireless device may further comprise:

a scan re-initiating unit configured to initiate a new scan if a scan ON instruction is received from said requester after the current scan is terminated;

a time point updating unit configured to delete the earliest historical initiation time point from the sequence of time-of-initiation, and write an initiation time point corresponding to the new scan into the sequence of time-of-initiation; and a scan information feedbacking unit configured to feed back scan information generated in the new scan to the requester.

Figure 8:
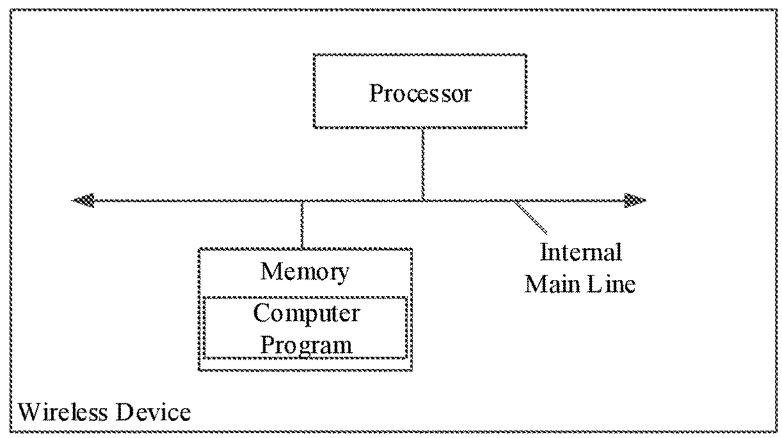
FIG. 8 is a structural diagram of a wireless device provided by an embodiment of the present disclosure.

Referring to FIG. 8, an embodiment of the present disclosure further provides a wireless device. The wireless device is provided with an upper limit for the number of times to initiate a scan in a specified period, and the wireless device comprises a memory and a processor, and the memory is configured to store a computer program and a sequence of time-of-initiation, the sequence of time-of-initiation comprises a specified number of historical initiation time points, and the specified number is determined based on the upper limit, the computer program is configured to implement, when being executed by the processor, the above method.

An embodiment of the present disclosure further provides a method for initiating and terminating a scan of a wireless device. Similarly, the wireless device is provided with an upper limit for the number of times to initiate a scan in a specified period. In this embodiment, a threshold duration may be predetermined based on the specified period and the upper limit, and may be used to determine whether the current scan service can be terminated. Specifically, a ratio of the specified period to the upper limit may be determined as the threshold duration. For example, if the wireless device is allowed to initiate the scan service for 5 times at most in 30 seconds, each scan service may last for 6 seconds before terminated on average, thus 6 seconds may be taken as the threshold duration.

Figure 9:
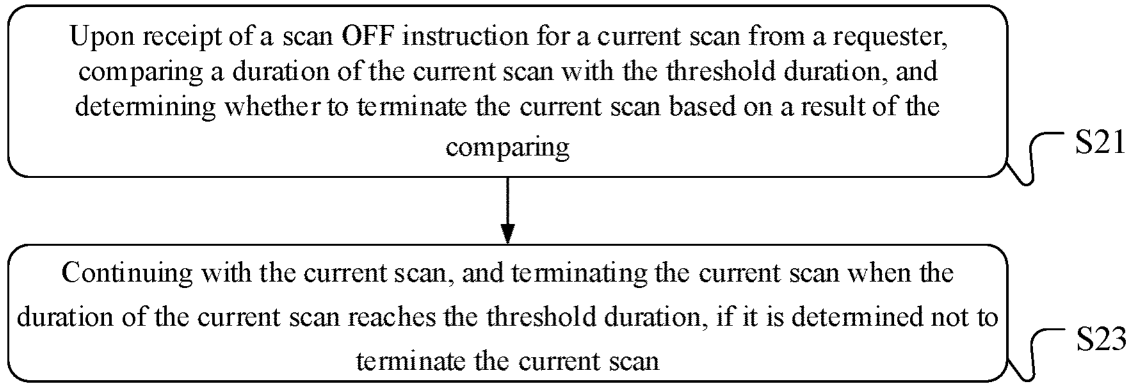
FIG. 9 is a flowchart of a method for initiating and terminating a scan of a wireless device provided by another embodiment of the present disclosure.

Referring to FIG. 9, a method for initiating and terminating a scan of a wireless device provided in an embodiment of the present disclosure may comprise the following steps.

S21: upon receipt of a scan OFF instruction for a current scan from a requester, comparing a duration of the current scan with the threshold duration, and determining whether to terminate the current scan based on a result of the comparing.

S23: continuing with the current scan, and terminating the current scan when the duration of the current scan reaches the threshold duration, if it is determined not to terminate the current scan.

In this embodiment, the ratio of the specified period to the upper limit may be used as the threshold duration, therefore in determining whether to terminate the current scan, it is determined not to terminate the current scan if the duration of the current scan is less than the threshold duration, and it is determined to terminate the current scan if the duration of the current scan is greater than or equal to the threshold duration.

If it is determined not to terminate the current scan, the service application component may continue with the current scan and terminate the current scan when the duration of the current scan reaches the threshold duration.

In one embodiment, when the scan OFF instruction is received, the feedback of the current scan information to the requester may be stopped in response to the scan OFF instruction. In this way, from the perspective of the requestor, the issued scan OFF instruction is responded to timely. But in fact, the current scan may be still in progress at the backend.

In one embodiment, if a scan ON instruction is received from the requester in the process of the current scan, the current scan information may be directly fed back to the requester since the current scan is actually not terminated, therefore the waiting time associated with initiation of the scan service may be saved. In addition, since the scan ON instruction is received, the current scan will not be terminated but will be continued when the duration of the current scan reaches the threshold duration. If a scan OFF instruction is received again in the process of the current scan, it may be determined whether to terminate the current scan according to the determination rule described in the above embodiments.

In one embodiment, if a scan ON instruction is received from the requester after the current scan is terminated, a new scan may be initiated and the scan information obtained in the new scan may be fed back to the requester. Of course, for the new scan, the service application component will not terminate it at the backend in response to a scan OFF instruction until the duration of this new scan reaches the threshold duration.

As can be seen from the above, in this embodiment, it is possible to determine a threshold duration for each scan service based on the specified period and the upper limit of the number of times to initiate a scan in the specified period, and the scan service can be terminated in response to the scan OFF instruction only when the threshold duration is reached.

An embodiment of the present disclosure further provides a wireless device, which is provided with an upper limit for the number of times to initiate a scan in a specified period, comprising:

a storage unit configured to store a threshold duration determined based on the specified period and the upper limit;

a determining unit configured to compare a duration of a current scan with the threshold duration, and determining whether to terminate the current scan based on a result of the comparing, upon receipt of a scan OFF instruction for the current scan from a requester; and a scan continuing unit configured to continue with the current scan and terminate the current scan when a duration of the current scan reaches the threshold duration, if it is determined not to terminate the current scan.

In one embodiment, the wireless device further comprises:

a scan information feedbacking unit configured to stop feedback of the current scan information to the requester in response to the scan OFF instruction.

In one embodiment, the wireless device further comprises:

a scan continuing unit configured to feed back the current scan information to the requester and continue with the current scan even after the duration of the current scan reaches said threshold duration, if a scan ON instruction is received from the requester in the process of the current scan.

An embodiment of the present disclosure further provides a wireless device. The wireless device is provided with an upper limit for the number of times to initiate a scan in a specified period, and comprises a memory and a processor. The memory is configured to store a computer program and a threshold duration determined based on the specified period and the upper limit, and the computer program is configured to implement, when being executed by said processor, the above method.

In the present disclosure, the memory may include physical devices for storing information, which may store, after digitalization, information in electrical, magnetic or optical manner. The memory in this embodiment may further include an apparatus for storing information in an electronic manner, such as RAM, ROM, and the like; an apparatus for storing information in a magnetic manner, such as a hard disk, a floppy disk, a magnetic tape, a magnetic core memory, a bubble memory, a USB flash disk; an apparatus for storing information in an optical manner, such as a CD or a DVD. Of course, there may be other types of memories, such as a quantum memory, a graphene memory, and the like.

In the present disclosure, the processor may be implemented in any suitable way. For example, the processor may take the form of, for instance, a microprocessor or processor, and a computer readable medium storing computer readable program codes (e.g., software or firmware) executable by the (micro) processor, a logic gate, a switch, an application-specific integrated circuit (ASIC), a programmable logic controller, and an embedded microcontroller, and the like.

In the wireless device provided in the embodiments of the present disclosure, the specific functionalities implemented by the memory and the processor of the wireless device can be comprehended with reference to the foregoing embodiments, and the same technical effect as that of the foregoing embodiments can be achieved, therefore detailed description is omitted herein.

As can be seen from the above, in the technical solutions provided in the embodiments of the present disclosure, a sequence of time-of-initiation, which may include historical initiation time points in a recent period of time, may be loaded in advance. The historical initiation time points may represent time points at which a wireless scan service is initiated. In practical applications, a wireless device may have an upper limit for the number of times to initiate a scan in a specified period, and the number of the historical initiation time points included in the sequence of time-of-initiation may be identical to the upper limit. For example, the wireless device may be allowed to initiate the scan service for 5 times at most in 30 seconds, and accordingly the sequence of time-of-initiation may include the latest 5 historical initiation time points. In this way, if a scan OFF instruction is received from the requester in the process of a scan service, the wireless device will not simply terminate the current scan, but rather calculate a time difference between a current time point and an earliest historical initiation time point in the sequence of time-of-initiation. If the time difference exceeds the specified period, it means that the number of scans initiated in the specified period does not exceed the upper limit, and a further scan service can be initiated if afterwards a scan ON instruction is received again from the requester. In such a case, the current scan can be simply terminated. However, if the calculated time difference is less than the specified period, it means that the number of scans initiated in the specified period has reached the upper limit. In this case, if the current scan is terminated, a scan ON instruction received from the requester shortly after cannot be responded to, because it is not allowed to initiate a further scan in the specified period. Thus, in the embodiments of the present disclosure, if the calculated time difference is less than the specified period, the current scan will not be terminated, but rather the process of the current scan will continue. However, feedback of the scan result to the requester may be stopped, therefore from the perspective of the requester, the current scan has been terminated, although in fact the scan is still in progress. When the current scan proceeds to a target time point, the process of the current scan can be normally terminated. The time difference between the target time point and the earliest historical initiation time point in the sequence of time-of-initiation is greater than or equal to the specified period, which guarantees that a next scan can be normally initiated after the current scan is terminated. Further, if a scan ON instruction is received from the requester in the process of the current scan, the current scan result can be immediately provided to the requester, since in fact the current scan has not been terminated. In this way, from the perspective of the requester, reception of the scan result is stopped in response to the scan OFF instruction, and is timely resumed in response to the scan ON instruction. Thus, in the embodiments of the present disclosure, it is possible to respond timely to the scan ON instruction and the scan OFF instruction issued from by the requester, the speed of response of the wireless device to the scan ON instruction and the scan OFF instruction is improved.

In the 1990s, it is easy to tell whether a technical improvement is a hardware improvement (for example, an improvement to a circuit structure such as a diode, a transistor, a switch, etc.), or a software improvement (an improvement to a methodical process). However, with the development of technologies, many improvements to methodical processes nowadays can be regarded as improvements to the hardware circuit structures. Basically, all improved methodical processes can be programmed into a hardware circuit to obtain corresponding hardware circuit structures. Therefore, it cannot be ruled out to implement an improvement to a methodical process with a physical hardware module. For example, a Programmable Logic Device (PLD) (e.g., Field Programmable Gate Array (FPGA)) is an integrated circuit of which logical functions are determined by user's programming of the device. The designer programs by himself to "integrate" a digital system into a piece of PLD, without needing to design and manufacture the ASIC chip by a chip manufacturer. Moreover, at present, instead of manually manufacturing the integrated circuit chips, such programming is mostly implemented by using software "logic compiler", which is similar to the software compiler used for program development, and the source codes to be compiled should be written in a specific programming language referred to as Hardware Description Language (HDL). There are many kinds of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently the most commonly used is Very-High-Speed Integrated Circuit Hardware Description Language (VHDL) and Verilog. It is comprehensible to those skilled in the art that a hardware circuit that implements a methodical process can be easily obtained by adequately programming the methodical process into an integrated circuit with the aforementioned hardware description languages.

The modules or units described in the foregoing embodiments can be implemented by a computer chip or entity, or implemented by a product having a specific function. A typical device implementation is a computer. Specifically, the computer can be, for example, a personal computer, a laptop computer, an on-board human-computer interaction device, a cellular phone, a camera phone, a smart phone, a personal digital assistant, a media player, a navigation device, an email device, a game console, a tablet computer, a wearable device, or a combination of any of these devices.

Although the embodiments of the present disclosure provide operation steps as depicted in the embodiment or flowchart, more or fewer operation steps may be included as necessary without involving creative efforts. The order of the steps as described in the embodiments is merely one of many orders for performing the steps, and rather is not meant to be unique. In practical implementation in an apparatus or a terminal, the steps can be either performed in the order depicted in the embodiments or the drawings, or be performed in parallel (for example, in an environment of parallel processors or multi-thread processing and even a distributed data processing). It is to be comprehended that, the terms "comprise", "include" or any other variant thereof do not mean to be exclusive in that a process, a method, a product or a device comprising or including a number of elements may comprise or include not only those elements, but also other elements not explicitly listed, or may further comprise or include elements inherent to such process, method, product or device. It is not excluded that a process, method, product or device comprising an element may further comprise other elements, if not specifically prescribed.

For ease of description, an apparatus is divided into units by functionalities to be described respectively. However, in practical implementation, the function of one unit may be implemented in a plurality of software and/or hardware entities, or vice versa, the functions of a plurality of units may be implemented in a single software and/or hardware entity. The above-described device embodiments are merely illustrative. In particular, segmentation of a device into units is merely in logic, and there may be other segmentations in actual implementation, for example, multiple units or components can be combined or integrated into another system, or some features can be omitted or deactivated. In addition, the illustrated or described mutual couplings between interfaces, units or devices may be direct couplings, or indirect couplings or implemented by communication connections, and can be in electrical, mechanical or other forms.

As known to those skilled in the art, in addition to implementing each application component in the form of the pure computer readable program codes, it is definitely possible to embody the method in a program to enable each application component to implement the same functionalities in the form of such as a logic gate, a switch, an application-specific integrated circuit, a programmable logic controller, or an embedded microcontroller. Thus, such an application component may be regarded as a hardware component, while means included therein for implementing respective functions may be regarded as parts in the hardware component. Furthermore, the means for implementing respective functions may be regarded as both software modules that implement the method and parts in the hardware component.

The present invention has been described with reference to flowcharts and/or block diagrams of the method and device of the embodiments in this disclosure. It should be understood that each process and/or block in the flowcharts and/or block diagrams and combinations of processes and/or blocks in the flowcharts and/or block diagrams can be implemented by computer program instructions. The computer program instructions may be provided to a general-purpose computer, a special-purpose computer, an embedded processor or a processor of other programmable data processing devices to form a machine, so that instructions executed by the computer or the processor of other programmable data processing devices form an apparatus configured to implement functions designated in one or more processes in a flowchart and/or one or more blocks in a block diagram.

The computer program instructions may also be stored in a computer readable memory which can guide the computer or other programmable data processing devices to operate in a specific manner, so that the instruction stored in the computer readable memory forms an article of manufacture comprising therein an instructing device, which implements functions designated in one or more processes in a flowchart and/or one or more blocks in a block diagram.

The computer program instructions may also be loaded onto a computer or other programmable data processing devices, so that a series of operational steps are performed on the computer or other programmable devices to form a computer implemented process, and therefore, the instructions executed in the computer or other programmable devices provide steps for implementing functions designated in one or more processes in a flowchart and/or one or more blocks in a block diagram.

In a typical configuration, the computing device may include one or more processors (CPUs), an input/output interface, a network interface, and a memory.

The memory may include a non-permanent memory, a Random-Access Memory (RAM) and/or a nonvolatile memory, such as Read-Only Memory (ROM) or a flash RAM, which belong to computer readable medium. The memory is an example of the computer readable medium.

The computer readable medium includes non-volatile and volatile medium as well as removable and non-removable medium, and can implement information storage by any method or technology. The information can be a computer readable instruction, a data structure, a program module or other data. An example of the storage medium of a computer includes, but is not limited to, a phase change memory (PRAM), a static random access memory (SRAM), a dynamic random access memory (DRAM), other types of RAM, a ROM, an electrically erasable programmable read-only memory (EEPROM), a flash memory or other memory technologies, a compact disk read-only memory (CD-ROM), a digital versatile disc (DVD) or other optical storage devices, a cassette tape, a magnetic tape/magnetic disk storage device, a graphene storage device or other magnetic storage devices, or any other non-transmission medium, and can be used to store information accessible to the computing device. According to the definition in this context, the computer readable medium does not include transitory media, such as a modulated data signal and a carrier wave.

Those skilled in the art should understand that the embodiments of the present disclosure can be provided as a method or a wireless device. Therefore, the embodiments of the present disclosure may be implemented in a form of an absolute hardware embodiment, an absolute software embodiment, or an embodiment combining software and hardware. Moreover, the embodiments of the present disclosure can be in the form of a computer program product implemented on one or more computer usable storage medium (including, but not limited to, a magnetic disk memory, a CD-ROM, an optical memory and the like) including computer program codes.

The present disclosure can be described in a general context of a computer executable instruction executed by a computer, for example, a program module. Generally, the program module may include a routine, a program, an object, a component, a data structure, and the like for performing a specific task or implementing a specific abstract data type. The present disclosure may also be implemented in a distributed computing environment. In the distributed computing environment, a task is performed by remote processing devices connected via a communication network. Further, in the distributed computing environment, the program module may be located in local and remote computer storage medium including a storage device.

The embodiments in the present disclosure are described in a progressive manner, which means descriptions of each embodiment are focused on the differences from other embodiments, and the descriptions of the same or similar aspects of the embodiments are applicable to each other. In particular, for the embodiments involving the wireless device, of which essence is analogous to that of the method embodiments, reference can be made to the method embodiments, and detailed description may be omitted. In the descriptions of the present disclosure, terms such as “one embodiment”, “some embodiments”, “example”, “specific example” or “some examples” imply that specific features, structures, materials or characteristics described in association with that embodiment or example are included in at least one embodiment or example in the present disclosure. In the present disclosure, descriptions associated with such terms do not necessarily pertains to the same embodiment or example. Rather, the described features, structures, materials or characteristics may be combined in a suitable manner in any one or more of the embodiments or examples. Furthermore, those skilled in the art can combine different embodiments or examples described in the present disclosure, and combine features of the different embodiments or examples, provided that they are not contradictory to each other.

The above descriptions involve merely some embodiments of the present disclosure, and are not intended to limit the present disclosure. Various modifications and variations may be made to the embodiments of the present disclosure by those skilled in the art. Any modifications, equivalents, improvements, and the like made within the spirit and principle of the present disclosure shall fall within the scope of the appended claims.

What is claimed is:

1. A method for initiating and terminating a scan of a wireless device, wherein said wireless device is provided with an upper limit for the number of times to initiate the scan in a specified period, wherein a sequence of time-of-initiation comprising a specified number of historical initiation time points is provided, and said specified number is determined based on said upper limit, wherein the method comprises:

receiving a scan OFF instruction from a requester;

calculating a time difference between a current time point and an earliest historical initiation time point in said sequence of time-of-initiation, and comparing said time difference with said specified period to determine whether to terminate a current scan, in response to said scan OFF instruction; and continuing with the current scan until a target time point, and terminating the current scan at said target time point, if it is determined not to terminate the current scan, wherein the time difference between said target time point and the earliest historical initiation time point in said sequence of time-of-initiation is greater than or equal to said specified period.

2. The method according to claim 1, wherein after receiving the scan OFF instruction from the requester, the method further comprises:

stopping feedback of current scan information to said requester in response to said scan OFF instruction.

3. The method according to claim 1, wherein comparing said time difference with said specified period to determine whether to terminate the current scan comprises:

determining not to terminate the current scan if said time difference is less than said specified period; and determining to terminate the current scan if said time difference is greater than or equal to said specified period.

4. The method according to claim 1, wherein a preset lag time is provided, and comparing said time difference with said specified period to determine whether to terminate the current scan comprises:

determining not to terminate the current scan if said time difference is less than a sum of said specified period and said preset lag time; and determining to terminate the current scan if said time difference is greater than or equal to the sum of said specified period and said preset lag time.

5. The method according to claim 1, further comprising:

feeding back current scan information to said requester, and continuing with the current scan even after said target time point, if a scan ON instruction is received from the requester in the process of the current scan.

6. The method according to claim 1, wherein, if a scan ON instruction is received from said requester after the current scan is terminated, the method further comprises:

initiating a new scan;

deleting said earliest historical initiation time point from said sequence of time-of-initiation, and writing an initiation time point corresponding to said new scan into said sequence of time-of-initiation; and feeding back scan information generated in said new scan to said requester.

7. A wireless device which is provided with an upper limit for the number of times to initiate a scan in a specified period, comprising:

a storage unit configured to store a sequence of time-of-initiation, wherein said sequence of time-of-initiation comprises a specified number of historical initiation time points, and said specified number is determined based on said upper limit;

an OFF instruction receiving unit configured to receive a scan OFF instruction from a requester;

a determining unit configured to calculate a time difference between a current time point and an earliest historical initiation time point in said sequence of time-of-initiation, and compare said time difference with said specified period to determine whether to terminate the current scan, in response to said scan OFF instruction; and a scan continuing unit configured to continue with the current scan until a target time point and terminate the current scan at said target time point, if it is determined not to terminate the current scan, wherein the time difference between said target time point and the earliest historical initiation time point in said sequence of time-of-initiation is greater than or equal to said specified period.

8. The wireless device according to claim 7, further comprising:

a scan information feedbacking unit configured to stop feedback of the current scan information to said requester in response to said scan OFF instruction.

9. The wireless device according to claim 7, further comprising:

a scan continuing unit configured to feed back the current scan information to said requester, and continue with the current scan even after said target time point, if a scan ON instruction is received from said requester in the process of the current scan.

10. The wireless device according to claim 7, further comprising:

a scan re-initiating unit configured to initiate a new scan if a scan ON instruction is received from said requester after the current scan is terminated;

a time point updating unit configured to delete said earliest historical initiation time point from said sequence of time-of-initiation, and write an initiation time point corresponding to said new scan into said sequence of time-of-initiation; and a scan information feedbacking unit configured to feed back scan information generated in said new scan to said requester.

11. A wireless device which is provided with an upper limit for the number of times to initiate a scan in a specified period, wherein said wireless device comprises a memory and a processor, and the memory is configured to store a computer program and a sequence of time-of-initiation, said sequence of time-of-initiation comprises a specified number of historical initiation time points, and said specified number is determined based on said upper limit, said computer program is configured to implement, when being executed by said processor, the method according to claim 1.

12. A method for initiating and terminating a scan of a wireless device, which is provided with an upper limit for the number of times to initiate a scan in a specified period, wherein a threshold duration determined based on said specified period and said upper limit is provided, the method comprising:

upon receipt of a scan OFF instruction for a current scan from a requester, comparing a duration of the current scan with said threshold duration, and determining whether to terminate the current scan based on a result of the comparing; and continuing with the current scan, and terminating the current scan when the duration of the current scan reaches said threshold duration, if it is determined not to terminate the current scan.

13. The method according to claim 12, wherein a ratio of said specified period to said upper limit is determined as said threshold duration, and determining whether to terminate the current scan based on the result of the comparing comprises:

determining not to terminate the current scan if the duration of the current scan is less than said threshold duration; and determining to terminate the current scan if the duration of the current scan is greater than or equal to said threshold duration.

14. The method according to claim 12, wherein after receiving the scan OFF instruction for the current scan from the requester, the method further comprises:

stopping feedback of current scan information to said requester in response to said scan OFF instruction.

15. The method according to claim 12, further comprising:

feeding back current scan information to said requester, and continuing with the current scan even after the duration of the current scan reaches said threshold duration, if a scan ON instruction is received from said requester in the process of the current scan.

16. The method according to claim 12, further comprising:

initiating a new scan, and feeding back scan information generated in said new scan to said requester, if a scan ON instruction is received from said requester after the current scan is terminated.

17. A wireless device which is provided with an upper limit for the number of times to initiate a scan in a specified period, comprising:

a storage unit configured to store a threshold duration determined based on said specified period and said upper limit;

a determining unit configured to compare a duration of a current scan with said threshold duration, and determining whether to terminate the current scan based on a result of the comparing, upon receipt of a scan OFF instruction for the current scan from a requester; and a scan continuing unit configured to continue with the current scan and terminate the current scan when a duration of the current scan reaches said threshold duration, if it is determined not to terminate the current scan.

18. The wireless device according to claim 17, further comprising:

a scan information feedbacking unit configured to stop feedback of the current scan information to the requester in response to said scan OFF instruction.

19. The wireless device according to claim 17, further comprising:

a scan continuing unit configured to feed back the current scan information to said requester, and continue with the current scan even after the duration of the current scan reaches said threshold duration, if a scan ON instruction is received from said requester in the process of the current scan.

20. A wireless device which is provided with an upper limit for the number of times to initiate a scan in a specified period, wherein said wireless device comprises a memory and a processor, and said memory is configured to store a computer program and a threshold duration determined based on said specified period and said upper limit, and said computer program is configured to implement, when being executed by said processor, the method according to claim 12.

* * * * *